(12) United States Patent
Jiang et al.

(10) Patent No.: US 10,424,127 B2
(45) Date of Patent: Sep. 24, 2019

(54) CONTROLLER ARCHITECTURE FOR MONITORING HEALTH OF AN AUTONOMOUS VEHICLE

(71) Applicant: GM GLOBAL TECHNOLOGY OPERATIONS LLC, Detroit, MI (US)

(72) Inventors: Shengbing Jiang, Rochester Hills, MI (US); Xinyu Du, Oakland Township, MI (US); Steven W. Holland, Saint Clair, MI (US); Chaitanya Sankavaram, Sterling Heights, MI (US); Azeem Sarwar, Rochester Hills, MI (US); Shiming Duan, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 232 days.

(21) Appl. No.: 15/688,457

(22) Filed: Aug. 28, 2017

(65) Prior Publication Data

US 2019/0066399 A1    Feb. 28, 2019

(51) Int. Cl.
| | | |
|---|---|---|
| G01M 17/00 | (2006.01) | |
| G06F 11/30 | (2006.01) | |
| G06F 7/00 | (2006.01) | |
| G06F 19/00 | (2018.01) | |
| G07C 5/00 | (2006.01) | |
| G05D 1/00 | (2006.01) | |
| G07C 5/08 | (2006.01) | |

(52) U.S. Cl.
CPC ........... *G07C 5/006* (2013.01); *G05D 1/0088* (2013.01); *G07C 5/008* (2013.01); *G07C 5/0808* (2013.01)

(58) Field of Classification Search
CPC ...... G05D 1/0088; G07C 5/006; G07C 5/008; G07C 5/0808
See application file for complete search history.

(56) References Cited

U.S. PATENT DOCUMENTS

| | | | |
|---|---|---|---|
| 2004/0078125 A1* | 4/2004 | Woodard | G07C 5/008 701/29.3 |
| 2009/0138141 A1* | 5/2009 | Nwadiogbu | G07C 5/0808 701/3 |
| 2009/0138423 A1* | 5/2009 | Nwadiogbu | G05B 23/0213 706/46 |

(Continued)

*Primary Examiner* — Harry Y Oh
(74) *Attorney, Agent, or Firm* — Quinn IP Law (57) ABSTRACT

A controller architecture for monitoring an autonomic vehicle control system includes a first controller, a second controller, a telematics controller, a third controller, a plurality of subsystem controllers, a first and a second communication bus, and a first and a second communication link. The telematics controller in communication with the first controller. The second controller includes a second processor and a second memory device. Each subsystem controller is configured to effect operation of one of a subsystem, wherein each of the subsystem controllers includes a vehicle health monitor (VHM) agent. The third controller includes a third processor and a third memory device. A first instruction set includes a prognostic classification routine based upon inputs from the VHM agents of the plurality of subsystem controllers. The telematics controller is disposed to communicate an output from the prognostic classification routine to an off-board controller.

18 Claims, 2 Drawing Sheets

(56) References Cited

U.S. PATENT DOCUMENTS

| | | | | |
|---|---|---|---|---|
| 2010/0131240 A1* | 5/2010 | Holland | ............... | G07C 5/008 |
| | | | | 702/183 |
| 2010/0161169 A1* | 6/2010 | Ramanathan | .......... | G07C 5/006 |
| | | | | 701/31.4 |
| 2010/0217479 A1* | 8/2010 | Dahl | .................... | G07C 5/0808 |
| | | | | 701/31.4 |
| 2011/0313614 A1* | 12/2011 | Hinnant, Jr. | ........ | G01M 5/0041 |
| | | | | 701/33.9 |
| 2013/0304307 A1* | 11/2013 | Safa-Bakhsh | .......... | G07C 5/006 |
| | | | | 701/31.4 |
| 2014/0306799 A1* | 10/2014 | Ricci | ....................... | H04W 4/21 |
| | | | | 340/5.83 |
| 2016/0247333 A1* | 8/2016 | Rockwell | ............. | G07C 5/0816 |
| 2017/0011561 A1* | 1/2017 | Makke | ................... | G07C 5/008 |
| 2017/0269593 A1* | 9/2017 | Letwin | ................ | B60W 50/082 |
| 2017/0358151 A1* | 12/2017 | Koons | ................. | G07C 5/0808 |
| 2018/0204398 A1* | 7/2018 | Smith | .................... | G07C 5/008 |
| 2018/0232959 A1* | 8/2018 | Thornburg | .......... | H04L 12/4625 |

\* cited by examiner

CONTROLLER ARCHITECTURE FOR MONITORING HEALTH OF AN AUTONOMOUS VEHICLE

INTRODUCTION

Autonomous vehicles can include on-board monitoring systems to detect occurrence of a fault or another indication of a need for service and/or vehicle maintenance.

SUMMARY

A controller architecture for monitoring an autonomic vehicle control system is described, and includes a first controller, a second controller, a telematics controller, a third controller, a plurality of subsystem controllers, a first and a second communication bus, and a first and a second communication link. The first controller includes a first processor and a first memory device, and the first memory device includes a first executable instruction set. The telematics controller in communication with the first controller. The second controller includes a second processor and a second memory device, and the second memory device includes a second executable instruction set, wherein the second executable instruction set is redundant to the first executable instruction set. Each subsystem controller is configured to effect operation of one of a subsystem, wherein each of the subsystem controllers includes a vehicle health monitor (VHM) agent. The third controller includes a third processor and a third memory device, and the third memory device includes a third executable instruction set disposed to effect fault mitigation. The first communication bus is disposed to effect communication between the first controller, the second controller and a first subset of the subsystem controllers. The second communication bus is disposed to effect communication between the first controller, the second controller and a second subset of the subsystem controllers. The first communication link is disposed to effect communication between the first controller and the third controller. The second communication link is disposed to effect communication between the second controller and the third controller. The first executable instruction set associated with the first controller includes a prognostic classification routine based upon inputs from the VHM agents of the plurality of subsystem controllers. The telematics controller is disposed to communicate an output from the prognostic classification routine to an off-board controller.

An aspect of the disclosure includes the prognostic classification software being executed to determine a prognostic associated with one of the subsystems.

Another aspect of the disclosure includes the second controller including a fourth executable instruction set configured to monitor a state of health (SOH) of the first controller.

Another aspect of the disclosure includes the off-board controller including a remote server that includes a processing device, a communication device, and a memory device that may be implemented in a cloud computing environment.

Another aspect of the disclosure includes each of the VHM agents being configured to perform component and sub-system monitoring, feature extraction, data filtering and data recording for the respective subsystem controller.

Another aspect of the disclosure includes the subsystem controllers including a drivetrain controller, a vehicle controller, a spatial monitoring controller, an HMI controller and an operator controller.

Another aspect of the disclosure includes the drivetrain controller being operably connected to a drivetrain, wherein the vehicle controller is operably connected to a steering system, a braking system and a chassis system, the spatial monitoring controller is operably connected to a vehicle spatial monitoring system, the HMI controller is operably connected to an HMI system, and the operator controller is operably connected to operator control devices.

Another aspect of the disclosure includes the third memory device of the third controller including a third executable instruction set disposed to effect fault mitigation associated with one of the subsystems.

Another aspect of the disclosure includes the first controller further including a fourth processor and a fourth memory device, wherein the first processor is disposed to communicate with the first communication bus to effect communication with the second controller and the first subset of the subsystem controllers, and the first processor is disposed to communicate with the second communication bus to effect communication with the second controller and the second subset of the subsystem controllers.

Another aspect of the disclosure includes the fourth processor of the first controller being disposed to communicate with the telematics controller.

Another aspect of the disclosure includes the fourth processor of the first controller being disposed to communicate with an HMI controller is operably connected to an HMI system disposed on-vehicle.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

Figure 1:
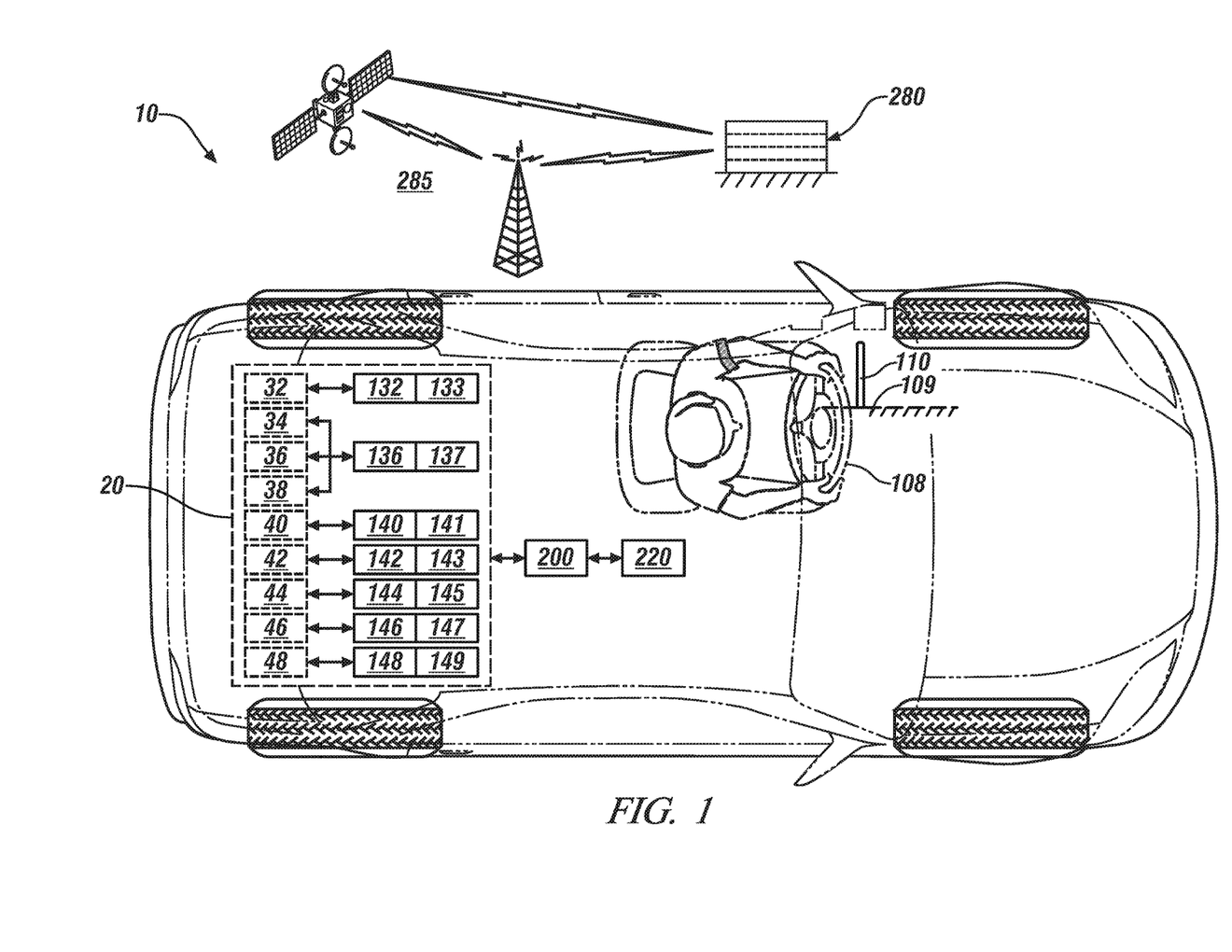
FIG. 1 schematically shows a vehicle including an autonomic vehicle control system, associated controllers and a vehicle health monitoring (VHM) system, in accordance with the disclosure.

Referring to the drawings, wherein like reference numerals correspond to like or similar components throughout the several Figures, FIG. 1, consistent with embodiments disclosed herein, illustrates a vehicle 10 that includes an autonomic vehicle control system 20 and an associated vehicle health monitoring (VHM) system 200 that is illustrative of the concepts described herein. The vehicle 10 includes, in one embodiment, a four-wheel passenger vehicle with steerable front wheels and fixed rear wheels. The vehicle 10 may include, by way of non-limiting examples, a passenger vehicle, a light-duty or heavy-duty truck, a utility vehicle, an agricultural vehicle, an industrial/warehouse vehicle, or a recreational off-road vehicle.

As employed herein, the autonomic vehicle control system 20 includes an on-vehicle control system that is capable of providing a level of driving automation. The terms 'driver' and 'operator' describe the person responsible for directing operation of the vehicle, whether actively involved in controlling one or more vehicle functions or directing autonomous vehicle operation. Driving automation can include a range of dynamic driving and vehicle operation. Driving automation can include some level of automatic control or intervention related to a single vehicle function, such as steering, acceleration, and/or braking, with the driver continuously having overall control of the vehicle. Driving automation can include some level of automatic control or intervention related to simultaneous control of multiple vehicle functions, such as steering, acceleration, and/or braking, with the driver continuously having overall control of the vehicle. Driving automation can include simultaneous automatic control of vehicle driving functions, including steering, acceleration, and braking, wherein the driver cedes control of the vehicle for a period of time during a trip. Driving automation can include simultaneous automatic control of vehicle driving functions including steering, acceleration, and braking, wherein the driver cedes control of the vehicle for an entire trip. Driving automation includes hardware and controllers configured to monitor the driving environment under various driving modes to perform various driving tasks during dynamic operation. Driving automation can include, by way of non-limiting examples, cruise control, adaptive cruise control, lane-change warning, intervention and control, automatic parking, acceleration, braking, and the like.

The autonomic vehicle control system 20 preferably includes one or a plurality of vehicle systems and associated controllers that provide a level of driving automation, and the VHM system 200 is disposed to monitor, prognosticate and/or diagnose operation of autonomic vehicle control system 20. Details of the architecture for the VHM system 200 are described with reference to FIG. 2. The vehicle systems, subsystems and controllers associated with the autonomic vehicle control system 20 are implemented to execute one or a plurality of operations associated with autonomous vehicle functions, including, by way of non-limiting examples, an adaptive cruise control (ACC) operation, lane guidance and lane keeping operation, lane change operation, steering assist operation, object avoidance operation, parking assistance operation, vehicle braking operation, vehicle speed and acceleration operation, vehicle lateral motion operation, e.g., as part of the lane guidance, lane keeping and lane change operations, etc. The vehicle systems and associated controllers of the autonomic vehicle control system 20 can include, by way of non-limiting examples, a drivetrain 32 and drivetrain controller (PCM) 132; a steering system 34, a braking system 36 and a chassis system 38, which are controlled by a vehicle controller (VCM) 136; a vehicle spatial monitoring system 40 and spatial monitoring controller 140, a human-machine interface (HMI) system 42 and HMI controller 142; an HVAC system 44 and associated HVAC controller 144; operator controls 46 and an associated operator controller 146; and an infotainment system 48 and infotainment controller 148. Each of the vehicle systems and associated controllers may further include one or more subsystems and associated controller. The subsystems and controllers are shown as discrete elements for ease of description. The foregoing classification of the subsystems is provided for purposes of describing one embodiment, and is illustrative. Other configurations may be considered within the scope of this disclosure. It should be appreciated that the functions described and performed by the discrete elements may be executed using one or more devices that may include algorithmic code, calibrations, hardware, application-specific integrated circuitry (ASIC), and/or off-board or cloud-based computing systems. As described with reference to FIG. 2, each of the aforementioned controllers includes a VHM agent, which can be implemented and executed as algorithmic code, calibrations, hardware, application-specific integrated circuitry (ASIC), or other elements. Each of the VHM agents is configured to perform component and sub-system monitoring, feature extraction, data filtering and data recording for the associated controller. The data recording can include periodic and/or event-based data recording, single time-point data recording and/or consecutive time-point data recording for certain time duration, such as before and/or after the trigger of an event. Such data recording can be accomplished employing circular memory buffers or another suitable memory device.

The PCM 132 communicates with and is operatively connected to the drivetrain 32, and executes control routines to control operation of an engine and/or other torque machines, a transmission and a driveline, none of which are shown, to transmit tractive torque to the vehicle wheels in response to driver inputs, external conditions, and vehicle operating conditions. The PCM 132 is shown as a single controller, but can include a plurality of controller devices operative to control various powertrain actuators, including the engine, transmission, torque machines, wheel motors, and other elements of the drivetrain 32, none of which are shown. By way of a non-limiting example, the drivetrain 32 can include an internal combustion engine and transmission, with an associated engine controller and transmission controller. Furthermore, the internal combustion engine may include a plurality of discrete subsystems with individual controllers, including, e.g., an electronic throttle device and controller, fuel injectors and controller, etc. The drivetrain 32 may also be composed of an electrically-powered motor/generator with an associated power inverter module and inverter controller. The control routines of the PCM 132 may also include an adaptive cruise control system (ACC) that controls vehicle speed, acceleration and braking in response to driver inputs and/or autonomous vehicle control inputs. The PCM 132 also includes a PCM VHM agent 133.

The VCM 136 communicates with and is operatively connected to a plurality of vehicle operating systems and executes control routines to control operation thereof. The vehicle operating systems can include braking, stability control, and steering, which can be controlled by actuators associated with the braking system 36, the chassis system 38 and the steering system 34, respectively, which are controlled by the VCM 136. The VCM 136 is shown as a single controller, but can include a plurality of controller devices operative to monitor systems and control various vehicle actuators. The VCM 136 also includes a VCM VHM agent 137.

The steering system 34 is configured to control vehicle lateral motion. The steering system 34 can include an electrical power steering system (EPS) coupled with an active front steering system to augment or supplant operator input through a steering wheel 108 by controlling steering angle of the steerable wheels of the vehicle 10 during execution of an autonomic maneuver such as a lane change maneuver. An exemplary active front steering system permits primary steering operation by the vehicle driver including augmenting steering wheel angle control to achieve a desired steering angle and/or vehicle yaw angle. Alternatively or in addition, the active front steering system can provide complete autonomous control of the vehicle steering function. It is appreciated that the systems described herein are applicable with modifications to vehicle steering control systems such as electrical power steering, four/rear wheel steering systems, and direct yaw control systems that control traction of each wheel to generate a yaw motion.

The braking system 36 is configured to control vehicle braking, and includes wheel brake devices, e.g., disc-brake elements, calipers, master cylinders, and a braking actuator, e.g., a pedal. Wheel speed sensors monitor individual wheel speeds, and a braking controller can be mechanized to include anti-lock braking functionality.

The chassis system 38 preferably includes a plurality of on-board sensing systems and devices for monitoring vehicle operation to determine vehicle motion states, and, in one embodiment, a plurality of devices for dynamically controlling a vehicle suspension. The vehicle motion states preferably include, e.g., vehicle speed, steering angle of the steerable front wheels, and yaw rate. The on-board sensing systems and devices include inertial sensors, such as rate gyros and accelerometers. The chassis system 38 estimates the vehicle motion states, such as longitudinal speed, yaw-rate and lateral speed, and estimates lateral offset and heading angle of the vehicle 10. The measured yaw rate is combined with steering angle measurements to estimate the vehicle state of lateral speed. The longitudinal speed may be determined based upon signal inputs from wheel speed sensors arranged to monitor each of the front wheels and rear wheels. Signals associated with the vehicle motion states that can be communicated to and monitored by other vehicle control systems for vehicle control and operation.

The vehicle spatial monitoring system 40 and spatial monitoring controller 140 can include a controller that communicates with sensing devices to monitor and generate digital representations of remote objects proximate to the vehicle 10. The spatial monitoring controller 140 also includes a spatial monitoring VHM agent 141. The spatial monitoring controller 140 can determine a linear range, relative speed, and trajectory of each proximate remote object, and includes front corner sensors, rear corner sensors, rear side sensors, side sensors, a front radar sensor, and a camera in one embodiment, although the disclosure is not so limited. Placement of the aforementioned sensors permits the spatial monitoring controller 140 to monitor traffic flow including proximate object vehicles and other objects around the vehicle 10. Data generated by the spatial monitoring controller 140 may be employed by a lane mark detection processor (not shown) to estimate the roadway. The sensing devices of the vehicle spatial monitoring system 40 can further include object-locating sensing devices including range sensors, such as FM-CW (Frequency Modulated Continuous Wave) radars, pulse and FSK (Frequency Shift Keying) radars, and Lidar (Light Detection and Ranging) devices, and ultrasonic devices which rely upon effects such as Doppler-effect measurements to locate forward objects. The possible object-locating devices include charged-coupled devices (CCD) or complementary metal oxide semi-conductor (CMOS) video image sensors, and other camera/video image processors which utilize digital photographic methods to 'view' forward objects including one or more object vehicle(s). Such sensing systems are employed for detecting and locating objects in automotive applications and are useable with systems including, e.g., adaptive cruise control, autonomous braking, autonomous steering and side-object detection.

The sensing devices associated with the vehicle spatial monitoring system 40 are preferably positioned within the vehicle 10 in relatively unobstructed positions. It is also appreciated that each of these sensors provides an estimate of actual location or condition of an object, wherein said estimate includes an estimated position and standard deviation. As such, sensory detection and measurement of object locations and conditions are typically referred to as 'estimates.' It is further appreciated that the characteristics of these sensors are complementary, in that some are more reliable in estimating certain parameters than others. Sensors can have different operating ranges and angular coverages capable of estimating different parameters within their operating ranges. For example, radar sensors can usually estimate range, range rate and azimuth location of an object, but are not normally robust in estimating the extent of a detected object. A camera with vision processor is more robust in estimating a shape and azimuth position of the object, but is less efficient at estimating the range and range rate of an object. Scanning type lidar sensors perform efficiently and accurately with respect to estimating range, and azimuth position, but typically cannot estimate range rate, and are therefore not as accurate with respect to new object acquisition/recognition. Ultrasonic sensors are capable of estimating range but are generally incapable of estimating or computing range rate and azimuth position. Further, it is appreciated that the performance of each sensor technology is affected by differing environmental conditions. Thus, some sensors present parametric variances during operation, although overlapping coverage areas of the sensors create opportunities for sensor data fusion.

The HVAC system 44 is disposed to manage the ambient environment of the passenger compartment, including, e.g., temperature, humidity, air quality and the like, in response to operator commands that are communicated to the HVAC controller 144, which controls operation thereof. The HVAC controller 144 also includes an HVAC VHM agent 145.

The operator controls 46 can be included in the passenger compartment of the vehicle 10 and may include, by way of non-limiting examples, a steering wheel 108, an accelerator pedal, a brake pedal and an operator input device 110. The operator controls 46 and associated operator controller 146 enable a vehicle operator to interact with and direct operation of the vehicle 10 in functioning to provide passenger transportation. The operator controller 146 also includes an operator controller VHM agent 147.

The steering wheel 108 can be mounted on a steering column 109 with the input device 110 mechanically mounted on the steering column 109 and configured to communicate with the operator controller 146. Alternatively, the input device 110 can be mechanically mounted proximate to the steering column 109 in a location that is convenient to the vehicle operator. The input device 110, shown herein as a stalk projecting from column 109, can include an interface device by which the vehicle operator may command vehicle operation in one or more autonomic control modes, e.g., by commanding activation of element(s) of the autonomic vehicle control system 20. The mechanization of the input device 110 is illustrative. The input device 110 may be mechanized in one or more of a plurality of devices, or may be in the form of a controller that is voice-activated, or may be another suitable system. The input device 110 preferably has control features and a location that is used by present turn-signal activation systems. Alternatively, other input devices, such as levers, switches, buttons, and voice recognition input devices can be used in place of or in addition to the input device 110.

The HMI system 42 provides for human/machine interaction, for purposes of directing operation of an infotainment system, a GPS system, a navigation system and the like, and includes an HMI controller 142. The HMI controller 142 monitors operator requests and provides information to the operator including status of vehicle systems, service and maintenance information. The HMI controller 142 can also include a global positioning/navigation system. The HMI controller 142 communicates with and/or controls operation of a plurality of operator interface devices, wherein the operator interface devices are capable of transmitting a message associated with operation of one of the autonomic vehicle control systems. The HMI controller 142 preferably also communicates with one or more devices that monitor biometric data associated with the vehicle operator, including, e.g., eye gaze location, posture, and head position tracking, among others. The HMI controller 142 is depicted as a unitary device for ease of description, but may be configured as a plurality of controllers and associated sensing devices in an embodiment of the system described herein. The HMI controller 142 also includes an HMI VHM agent 143. Operator interface devices can include devices that are capable of transmitting a message urging operator action, and can include an electronic visual display module, e.g., a liquid crystal display (LCD) device, a heads-up display (HUD), an audio feedback device, a wearable device and a haptic seat. The operator interface devices that are capable of urging operator action are preferably controlled by or through the HMI controller 142. The HUD may project information that is reflected onto an interior side of a windshield of the vehicle, in the field of view of the operator, including transmitting a confidence level associated with operating one of the autonomic vehicle control systems. The HUD may also provide augmented reality information, such as lane location, vehicle path, directional and/or navigational information, and the like. HUD and related systems are understood by those skilled in the art.

In one embodiment, the vehicle 10 is configured to communicate with the communication network 285, including communicating between a controller associated with an intelligent highway system and the vehicle 10. An intelligent highway system can be configured to monitor locations, speeds and trajectories of a plurality of vehicles, with such information employed to facilitate control of one or a plurality of similarly-situated vehicles. This can include communicating geographic location, forward velocity and acceleration rate of one or more vehicles in relation to the vehicle 10. In one embodiment, the vehicle 10 is configured to communicate with the off-board controller 280 via the communication network 285.

Figure 2:
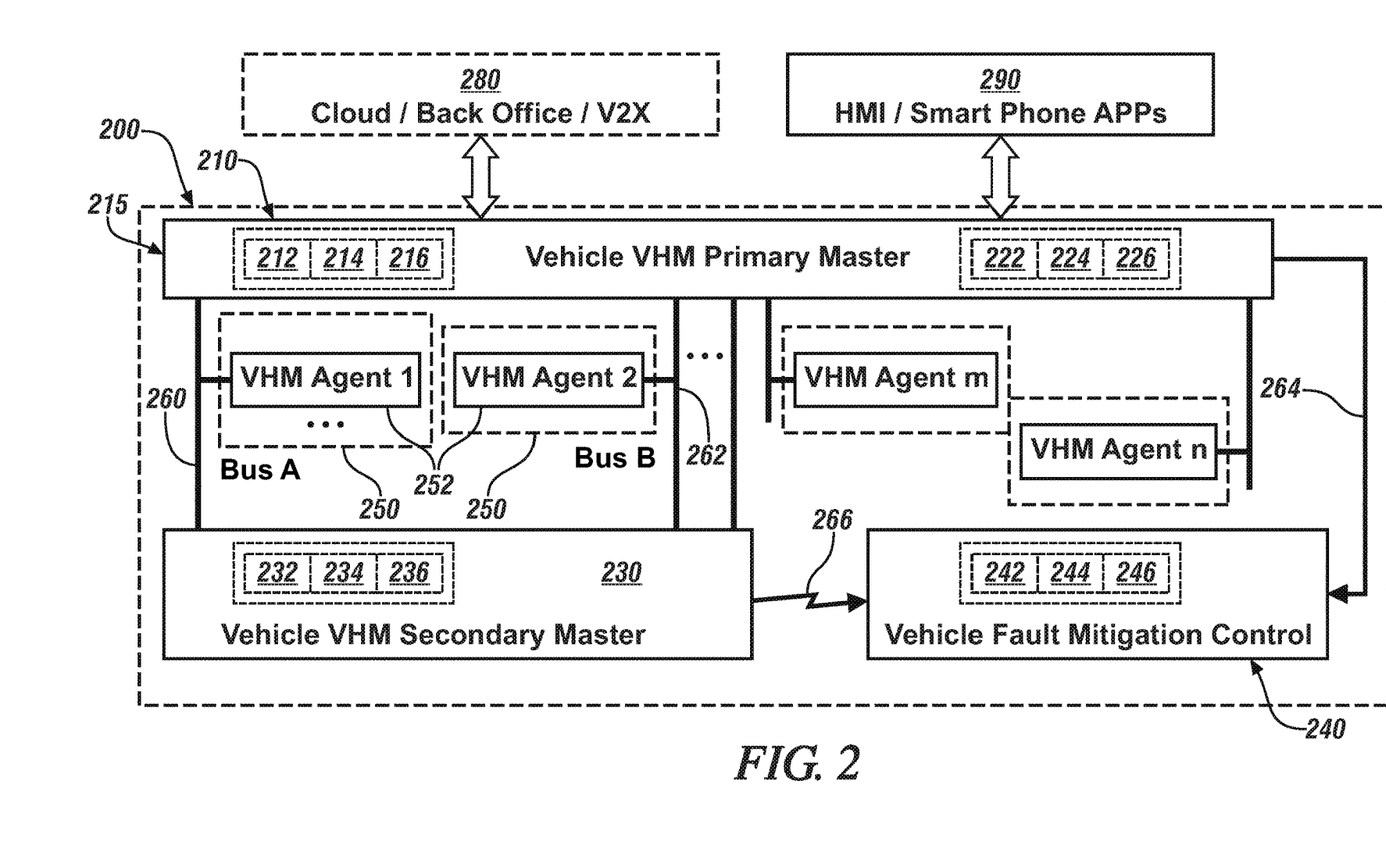
FIG. 2 schematically shows an embodiment of a vehicle health monitoring (VHM) system for an autonomic vehicle control system, including an embodiment of a dual-core processor, in accordance with the disclosure.

The VHM system 200 is configured to autonomously monitor health of various on-board subsystems that perform one or more functions related to autonomous vehicle operation. The VHM system 200 includes a controller architecture that is configured with multilayer hierarchical VHM data processing, collection, and storage employing the plurality of VHM agents that are associated with the VHM master controller 215 (first controller) that can communicate with an off-board controller 280. This configuration can serve to reduce data processing complexity, data collection and data storage costs. The VHM system 200 provides a centralized system monitoring and a distributed system monitoring arrangement with data collection via the VHM master controller 215 and the plurality of VHM agents to provide a rapid response time and an integrated vehicle/system level coverage. The VHM system 200 also includes a fault mitigation controller 240 and a redundant VHM master controller 230 to verify integrity of VHM information employed by the fault mitigation controller 240. The redundant VHM master controller 230 includes a redundant processor 232, a redundant memory device 234 and a redundant instruction set 236. The fault mitigation controller 240 includes a processor 242, a memory device 244 and an instruction set 246. The VHM master controller 215, the plurality of VHM agents and the redundant VHM master controller 230 form a communication network for communication via a first communication bus 260 and a second communication bus 262.

The VHM master controller 215 is implemented as executable code and associated hardware elements in a dual-core processor 210 that includes a first processor 212 with an associated first memory device 214 containing a first instruction set 216 and a second processor 222 with an associated second memory device 224 containing a second instruction set 226. The configuration provides a firewall that separates a vehicle-side network, e.g., the VHM system 200, from off-board networks, such as the communication network 285 and the off-board controller 280. The VHM master controller 215 is preferably resident in and executed as control routines in the first processor 212, first memory device 214 and first instruction set 216 during vehicle key-on periods. The VHM master controller 215 includes control routines to collect, aggregate and store data from the VHM agents described with reference to FIG. 1. The VHM master controller 215 also includes executable diagnosis and prognosis routines.

The VHM master controller 215 communicates with the fault mitigation controller 240 via a first datalink 264. The redundant VHM master controller 230 communicates with the fault mitigation controller 240 via a second datalink 266. The first and second datalinks 264, 266 can include a communication link, including e.g., direct-wired or wireless links. A telematics controller 220 communicates with the first processor 212 of the VHM master controller 215 and with an HMI App 290.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine-readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. The term 'model' refers to a processor-based or processor-executable code and associated calibration that simulates a physical existence of a device or a physical process. The terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The terms "calibration", "calibrate", and related terms refer to a result or a process that compares an actual or standard measurement associated with a device with a perceived or observed measurement or a commanded position. A calibration as described herein can be reduced to a storable parametric table, a plurality of executable equations or another suitable form.

Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

The terms "prognosis", "prognostics", and related terms are associated with data monitoring and algorithms and evaluations that render an advance indication of a likely future event associated with a component, a subsystem, or a system. Prognostics can include classifications that include a first state that indicates that the component, subsystem, or system is operating in accordance with its specification ("Green" or "G"), a second state that indicates deterioration in the operation of the component, subsystem, or system ("Yellow" or "Y"), and a third state that indicates a fault in the operation of the component, subsystem, or system ("Red" or "R"). The terms "diagnostics", "diagnosis" and related terms are associated with data monitoring and algorithms and evaluations that render an indication of presence or absence of a specific fault with a component, subsystem or system. The term "mitigation" and related terms are associated with operations, actions or control routine that operate to lessen the effect of a fault in a component, subsystem or system.

The VHM master controller 215 can communicate with the off-board controller 280 for 2-way transfer of VHM data to the off-board controller 280. The VHM master controller 215 is configured to monitor a state of health (SOH) associated with communication with the off-board controller 280. The VHM master controller 215 is configured to communicate with in-vehicle controllers, e.g., the HMI controller 142 and the HMI App 290 for vehicle system SOH information. The VHM master controller 215 is configured to monitor the SOH of the redundant VHM master controller 230. The VHM master controller 215 is configured to perform vehicle system diagnosis and prognosis based on onboard data and inputs from the off-board controller 280. The VHM master controller 215 is configured to dynamically detect anomalies, e.g., intermittent faults, and forward relevant data to the off-board controller 280, which can be accessed for engineering analysis. The VHM master controller 215 can communicate diagnosis and prognosis results to the fault mitigation controller 230.

The second processor 222, second memory device 224 and second instruction set 226 are configured to execute control routines to function as a data buffer that communicates with the HMI App 290 and the off-board controller 280 via the telematics controller 220 during vehicle key-on periods.

The telematics controller 220 includes a wireless telematics communication system capable of extra-vehicle communications, including communicating with a communication network system 285 having wireless and wired communication capabilities. The telematics controller 220 is capable of extra-vehicle communications that includes short-range vehicle-to-vehicle (V2V) communication. Alternatively or in addition, the telematics controller 220 has a wireless telematics communication system capable of short-range wireless communication to a handheld device, e.g., a cell phone, a satellite phone or another telephonic device. In one embodiment the handheld device is loaded with a software application that includes a wireless protocol to communicate with the telematics controller 220, and the handheld device executes the extra-vehicle communication, including communicating with the off-board controller 280 via the communication network 285. Alternatively or in addition, the telematics controller 220 executes the extra-vehicle communication directly by communicating with the off-board controller 280 via a communication network 285.

The redundant VHM master controller 230 operates to collect, aggregate and store the data from the plurality of VHM agents for specific subsystems. This can include performing diagnosis and prognosis for the specific subsystems based on onboard data and inputs from the off-board controller 280. The redundant VHM master controller 230 can communicate results to the fault mitigation controller 240, wherein such results are associated with the diagnosis and prognosis for specific subsystems. The redundant VHM master controller 230 can communicate with the VHM master controller 215 to obtain data that is stored in the off-board controller 280. The redundant VHM master controller 230 can monitor the state of health (SOH) of the VHM master controller 215.

The fault mitigation controller 240 includes of multiple redundant units to effect vehicle control to mitigate effects associated with occurrence of a fault. The fault mitigation controller 240 can perform cross-checking of the diagnosis and prognosis results obtained by both the VHM master controller 215 and the redundant VHM master controller 230 for critical systems. The fault mitigation controller 240 can perform fault mitigation control based on diagnosis and prognosis results that have been validated.

The VHM master controller 215 can communicate with the off-board controller 280, and other vehicles (V2V) on fault mitigation control actions. The VHM master controller 215 can provide a central, common gateway for all off-board VHM functions by managing communications and commands, and managing two-way data transfers. The VHM master controller 215 can collect and store parameters from specific ones of the VHM agents that may be needed for prognostic evaluations. The VHM master controller 215 can centralize prognostic parameter capture from the VHM agents where placement in other controllers is not required due to frequency and/or latency issues. The VHM master controller 215 includes an on-board prognostics algorithm execution using captured parameters on-board the vehicle 10. The VHM master controller 215 can detect data anomalies. The VHM master controller 215 can recognize important events (intermittent fault conditions, degradation events and precursors of imminent fault conditions) and direct the data collection appropriate for these events. The VHM master controller 215 can provide real-time trend monitoring for critical parameters that are communicated from the VHM agents, such as detection of slow air-pressure leaks in tires or steadily decline in battery SOC. The VHM master controller 215 can perform feature extraction from sensors and parameters that are communicated from the VHM agents and data abstraction for communication to the off-board controller 280. The VHM master controller 215 can execute state transition monitoring (trace handshaking) to recover from deadlocks and to pinpoint performance bottlenecks.

The VHM master controller 215 can execute or facilitate execution of BIT (built-in test)/DTC (diagnostic trouble codes), IBIT (initiated built-in test) sequences during normal operation and in a service bay environment. The VHM master controller 215 can host customized APPs that can be downloaded from engineering centers for monitoring, data capture, and analysis to support targeted evaluations related to one or more of the VHM agents and associated subsystems. The VHM master controller 215 can buffer collected data to manage data transmission, such as transmitting data on-demand, transmitting summary data, and transmitting results of on-board analysis. This includes hierarchical data buffering to reduce unnecessary data transfers. The VHM master controller 215 can execute compaction of data for transfer, to reduce data volume, and accompanying data encryption to enhance data security.

Prognostic classification routines to determine a prognostic, i.e., R/Y/G, for each of the subsystems can be executed in the VHM master controller 215 or the HMI App 290. The prognostic classification routines can detect occurrence of a Green prognostic associated with one of the vehicle subsystems and associated controllers of the autonomic vehicle control system 20, and the VHM master controller 215 or the HMI App 290 can block associated data transmission off board via the communication network 285 to reduce data communication load to the off-board controller 280. Alternatively, the transmission of a Green prognostic can be in the form of a simple acknowledgement of Green determination for a component, subsystem, or system of one of the vehicle systems and associated controllers of the autonomic vehicle control system 20 with a time stamp, thus minimizing the data transmission load to the off-board controller 280.

External monitoring of control system states, which are keyed to a defined state transition diagram, can be executed to follow design intent and time out when deadlock happens or control system fails to follow expectations, e.g., following the sequence of check-offs needed to allow the vehicle to start once the key has been turned or the start button pressed to diagnose abnormal sequences or extended delays and pinpoint the reason for not proceeding to start the vehicle.

The off-board controller 280 can include a remote server that includes a processing device, a communication device, and memory device that may be implemented in a cloud computing environment. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The HMI App 290 is a software program that is executable on a hand-held device that includes a processing device, a communication device, a memory device and a user interface. The HMI App 290 allows a user to interact with the VHM master controller 215. Users can include service personnel, for example. The term "user interface" can include, but is not limited to, a touch screen, a physical keyboard, a mouse, a microphone, and/or a speaker. In one embodiment, the touch screen is responsive to tactile inputs from a user, including but not limited to pointing, tapping, dragging, two-finger pinching, two-finger expanding, etc. The HMI App 290 can display SOH information related to subsystems of the autonomic vehicle control system 20, including displaying or otherwise conveying prognostics and diagnostics information that can be obtained from one of the VHM agents. The HMI App 290 can inform the operator or others about mitigation actions undertaken based upon the SOH of the vehicle or a surrounding vehicle. The HMI App 290 can execute on-demand SOH testing based upon input from an operator.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special-purpose hardware-based systems that perform the specified functions or acts, or combinations of special-purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A controller architecture for monitoring an autonomic vehicle control system, comprising:
   a first controller including a first processor and a first memory device, the first memory device including a first executable instruction set;
   a telematics controller in communication with the first controller;
   a second controller including a second processor and a second memory device, the second memory device including a second executable instruction set, wherein the second executable instruction set is redundant to the first executable instruction set;
   a plurality of subsystem controllers, each subsystem controller configured to effect operation of a subsystem of the autonomic vehicle control system, wherein each of the subsystem controllers includes a vehicle health monitor (VHM) agent;
   a third controller including a third processor and a third memory device, the third memory device including a third executable instruction set disposed to effect fault mitigation;
   a first communication bus disposed to effect communication between the first controller, the second controller and a first subset of the subsystem controllers;
   a second communication bus disposed to effect communication between the first controller, the second controller and a second subset of the subsystem controllers;
   a first communication link disposed to effect communication between the first controller and the third controller; and
   a second communication link disposed to effect communication between the second controller and the third controller;
   wherein the first executable instruction set associated with the first controller includes a prognostic classification routine based upon inputs from the VHM agents of the plurality of subsystem controllers; and
   wherein the telematics controller is disposed to communicate an output from the prognostic classification routine to an off-board controller.

2. The controller architecture of claim 1, wherein the prognostic classification software is executed to determine a prognostic associated with one of the subsystems.

3. The controller architecture of claim 1, wherein the second controller includes a fourth executable instruction set configured to monitor a state of health (SOH) of the first controller.

4. The controller architecture of claim 1, wherein the off-board controller includes a remote server that includes a processing device, a communication device, and a memory device that may be implemented in a cloud computing environment.

5. The controller architecture of claim 1, wherein each of the VHM agents is configured to perform component and sub-system monitoring, feature extraction, data filtering and data recording for the respective subsystem controller.

6. The controller architecture of claim 1, wherein the subsystem controllers include a drivetrain controller, a vehicle controller, a spatial monitoring controller, an HMI controller and an operator controller.

7. The controller architecture of claim 6:
   wherein the drivetrain controller is operably connected to a drivetrain;
   wherein the vehicle controller is operably connected to a steering system, a braking system and a chassis system;
   wherein the spatial monitoring controller is operably connected to a vehicle spatial monitoring system;
   wherein the HMI controller is operably connected to an HMI system; and
   wherein the operator controller is operably connected to operator control devices.

8. The controller architecture of claim 1, wherein the third memory device of the third controller includes a third executable instruction set disposed to effect fault mitigation associated with one of the subsystems.

9. The controller architecture of claim 1, wherein the first controller further comprises
   a fourth processor and a fourth memory device;
   wherein the first processor is disposed to communicate with the first communication bus to effect communication with the second controller and the first subset of the subsystem controllers;
   wherein the first processor is disposed to communicate with the second communication bus to effect communication with the second controller and the second subset of the subsystem controllers.

10. The controller architecture of claim 9, wherein the fourth processor of the first controller is disposed to communicate with the telematics controller.

11. The controller architecture of claim 9, wherein the fourth processor of the first controller is disposed to communicate with an HMI controller is operably connected to an HMI system disposed on-vehicle.

12. A controller architecture for monitoring an autonomic vehicle control system, comprising:
   a first controller including a first executable instruction set;
   a telematics controller in communication with the first controller;
   a second controller including a second executable instruction set, wherein the second executable instruction set is redundant to the first executable instruction set;
   a plurality of subsystem controllers, each subsystem controller configured to effect operation of a subsystem of the autonomic vehicle control system, wherein each of the subsystem controllers includes a vehicle health monitor (VHM) agent;
   a third controller including a third executable instruction set disposed to effect fault mitigation;
   a plurality of communication buses disposed to effect communication between the first controller, the second controller and a first subset of the subsystem controllers and a second subset of the subsystem controllers;
   wherein the first executable instruction set associated with the first controller includes a prognostic classification routine based upon inputs from the VHM agents of the plurality of subsystem controllers; and
   wherein the telematics controller is disposed to communicate an output from the prognostic classification routine to an off-board controller.

13. The controller architecture of claim 12, wherein the prognostic classification software is executed to determine a prognostic associated with one of the subsystems.

14. The controller architecture of claim 12, wherein the second controller includes a fourth executable instruction set configured to monitor a state of health (SOH) of the first controller.

15. The controller architecture of claim 12, wherein the off-board controller includes a remote server that includes a processing device, a communication device, and a memory device that may be implemented in a cloud computing environment.

16. The controller architecture of claim 12, wherein each of the VHM agents is configured to perform component and sub-system monitoring, feature extraction, data filtering and data recording for the respective subsystem controller.

17. The controller architecture of claim 12, wherein the subsystem controllers include a drivetrain controller, a vehicle controller, a spatial monitoring controller, an HMI controller and an operator controller.

18. The controller architecture of claim 17:
  wherein the drivetrain controller is operably connected to a drivetrain;
  wherein the vehicle controller is operably connected to a steering system, a braking system and a chassis system;
  wherein the spatial monitoring controller is operably connected to a vehicle spatial monitoring system;
  wherein the HMI controller is operably connected to an HMI system; and
  wherein the operator controller is operably connected to operator control devices.

\* \* \* \* \*